United States Patent
Seo et al.

(10) Patent No.: US 10,582,490 B2
(45) Date of Patent: *Mar. 3, 2020

(54) METHOD FOR TRANSCEIVING SIGNAL BASED ON DYNAMIC CHANGE OF WIRELESS RESOURCE IN WIRELESS COMMUNICATIONS SYSTEM AND APPARATUS THEREFOR

(71) Applicant: LG ELECTRONICS INC., Seoul (KR)

(72) Inventors: Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/532,115

(22) Filed: Aug. 5, 2019

(65) Prior Publication Data

US 2019/0364547 A1    Nov. 28, 2019

Related U.S. Application Data

(63) Continuation of application No. 16/101,224, filed on Aug. 10, 2018, which is a continuation of application
(Continued)

(51) Int. Cl.
*H04W 72/04*    (2009.01)
*H04W 72/14*    (2009.01)

(52) U.S. Cl.
CPC ......... *H04W 72/042* (2013.01); *H04W 72/14* (2013.01); *H04W 72/0446* (2013.01)

(58) Field of Classification Search
CPC .................................................. H04W 72/042
(Continued)

(56) References Cited

U.S. PATENT DOCUMENTS 6,275,864 B1    8/2001    Mancusi et al.
9,398,607 B2    7/2016    Seo et al.
(Continued)

FOREIGN PATENT DOCUMENTS

CN    102076098    5/2011
CN    102158964    8/2011
(Continued)

OTHER PUBLICATIONS

Russian Office Action issued in Application No. 2015126291/07, dated Jun. 15, 2016, 11 pages.
(Continued)

*Primary Examiner* — Peter G Solinsky
(74) *Attorney, Agent, or Firm* — Lee Hong Degerman Kang Waimey

(57) ABSTRACT

The present application discloses a method for enabling a terminal to transceive a signal with a base station in a TDD (Time Division Duplex) communications system. Specifically, the method includes the steps of: receiving reference sub-frame set information through the system information and active sub-frame set information through dynamic signaling; receiving an uplink grant for transmitting an uplink signal in a downlink sub-frame defined in the active sub-frame set information; judging the effectiveness of a particular uplink sub-frame for transmitting the uplink signal commanded by the uplink grant; and transmitting the uplink signal to the base station if the particular uplink sub-frame is effective.

11 Claims, 11 Drawing Sheets

Related U.S. Application Data

No. 14/758,472, filed as application No. PCT/KR2014/000085 on Jan. 6, 2014, now Pat. No. 10,091,773.

(60) Provisional application No. 61/836,656, filed on Jun. 18, 2013, provisional application No. 61/821,690, filed on May 9, 2013, provisional application No. 61/755,935, filed on Jan. 23, 2013, provisional application No. 61/749,876, filed on Jan. 7, 2013.

(58) Field of Classification Search
USPC .......................................................... 370/280
See application file for complete search history.

(56) References Cited

U.S. PATENT DOCUMENTS

| | | | |
|---|---|---|---|
| 9,680,522 | B2 | 6/2017 | Ekpenyong et al. |
| 10,091,773 | B2 | 10/2018 | Seo et al. |
| 2011/0134774 | A1 | 6/2011 | Pelletier et al. |
| 2012/0300641 | A1 | 11/2012 | Chen et al. |
| 2012/0327821 | A1 | 12/2012 | Lin et al. |
| 2013/0010722 | A1 | 1/2013 | Suzuki et al. |
| 2013/0083683 | A1 | 4/2013 | Hwang et al. |
| 2013/0272170 | A1 | 10/2013 | Chatterjee et al. |
| 2013/0286904 | A1 | 10/2013 | Xu et al. |
| 2013/0301490 | A1 | 11/2013 | He et al. |
| 2014/0064233 | A1 | 3/2014 | Oizumi et al. |
| 2014/0092785 | A1 | 4/2014 | Song et al. |
| 2015/0188690 | A1 | 7/2015 | Khoryaev et al. |
| 2015/0195063 | A1 | 7/2015 | Ro et al. |
| 2015/0237626 | A1 | 8/2015 | Li et al. |
| 2015/0249531 | A1 | 9/2015 | Lindoff et al. |
| 2015/0312937 | A1 | 10/2015 | Suzuki et al. |
| 2015/0351119 | A1 | 12/2015 | Song et al. |
| 2015/0373675 | A1 | 12/2015 | Seo et al. |
| 2017/0245274 | A1 | 8/2017 | Oizumi et al. |
| 2019/0037541 | A1* | 1/2019 | Seo ...................... H04W 72/14 |

FOREIGN PATENT DOCUMENTS

| | | |
|---|---|---|
| CN | 102291837 | 12/2011 |
| JP | 2010518788 | 5/2010 |
| JP | 2012-147131 A | 8/2012 |
| RU | 2420880 C2 | 6/2011 |
| WO | 2010052566 | 5/2010 |
| WO | 2011/120284 A1 | 10/2011 |
| WO | 2012/059064 A1 | 5/2012 |
| WO | 2012/124923 | 9/2012 |
| WO | 2012/128599 A2 | 9/2012 |
| WO | 2012/138149 | 10/2012 |
| WO | 2013/111607 A1 | 8/2013 |

OTHER PUBLICATIONS

European Search Report issued in Application No. 14735421.1, dated Jul. 18, 2016, 6 pages.
LG Electronics, "Support of half-duplex operation based CA with different TDD UL-DL configurations," 3GPP TSG RAN WG1 #71, R1-124969, New Orleans, USA, Nov. 12-16, 2012, 4 pages.
Renesas Mobile Europe Ltd., "Discussion on Enhancements for Dynamic TDD UL-DL Configuration," 3GPP TSG-RAN WG1 Meeting #69, R1-122363, Prague, Czech Republic, May 21-25, 2012, 4 pages.
Huawei, "Methods to support different time scales for TDD UL-DL reconfiguration," 3GPP TSG-RAN WG1 #69, R1-122909, May 2012, 4 pages.
Alcatel-Lucent Shanghai Bell, et al., "Discussion on timing issues with dynamic TDD UL-DL configuration," 3GPP TSG RAN WG1 Meeting #69, R1-122510, May 2012, 8 pages.
Alcatel-Lucent Shanghai Bell, et al., "Discussion on HARQ and UL-grant timing with dynamic TDD UL-DL configuration," 3GPP TSG RAN WG1 Meeting #68bis, R1-121260, Mar. 2012, 6 pages.
PCT International Application No. PCT/KR2014/000085, Written Opinion of the International Searching Authority dated Apr. 7, 2014, 17 pages.
U.S. Appl. No. 14/758,472, Office Action dated Nov. 15, 2017, 16 pages.
U.S. Appl. No. 14/758,472, Final Office Action dated Jun. 1, 2017, 17 pages.
U.S. Appl. No. 14/758,472, Office Action dated Nov. 1, 2016, 21 pages.
U.S. Appl. No. 16/101,224, Office Action dated Nov. 29, 2018, 38 pages.
European Patent Office Application Serial No. 17165731.5, Search Report dated Jul. 12, 2017, 11 pages.
Intellectual Property Office of India Application No. 1764/MUMNP/2015, Office Action dated Oct. 31, 2019, 6 page.

* cited by examiner

FIG. 2
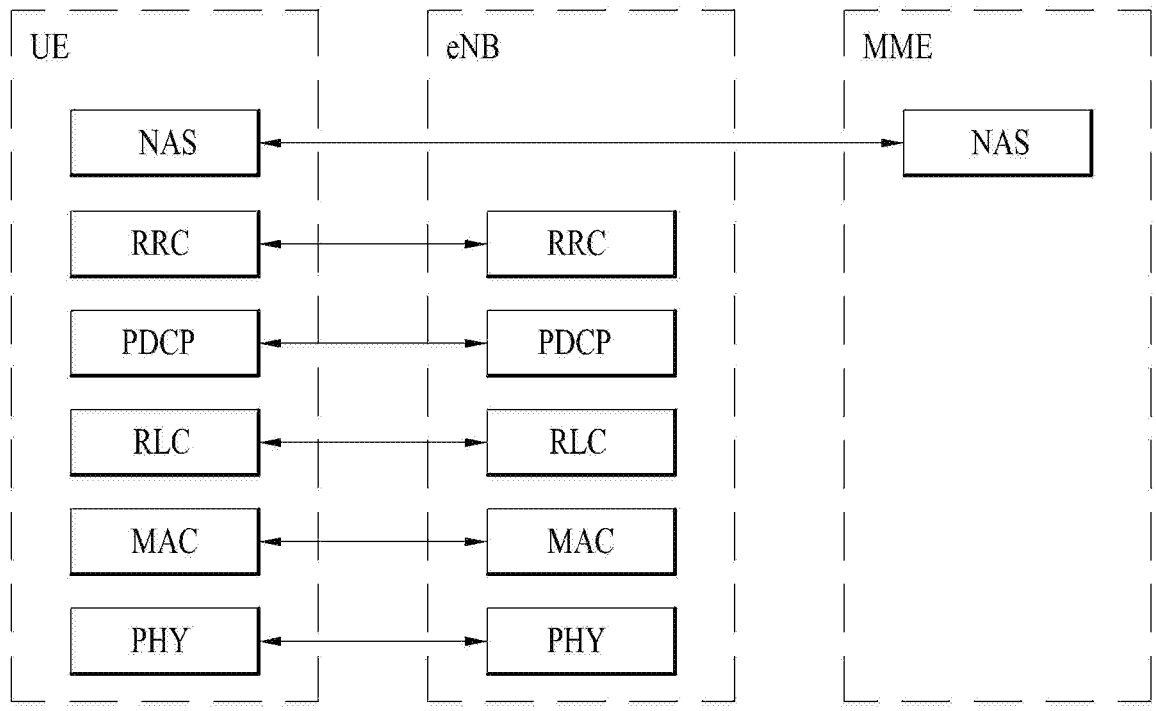
(a) Control-Plane Protocol Stack
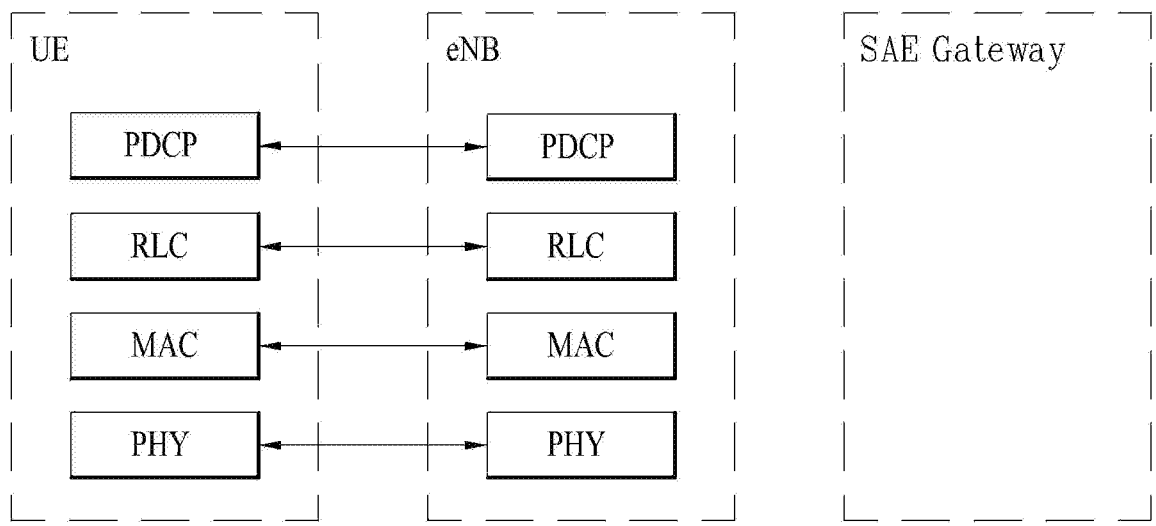
(b) User-Plane Protocol Stack

METHOD FOR TRANSCEIVING SIGNAL BASED ON DYNAMIC CHANGE OF WIRELESS RESOURCE IN WIRELESS COMMUNICATIONS SYSTEM AND APPARATUS THEREFOR

CROSS-REFERENCE TO RELATED APPLICATIONS

This application is a continuation of U.S. patent application Ser. No. 16/101,224, filed on Aug. 10, 2018, now U.S. Pat. No. 10,420,093, which is a continuation of U.S. patent application Ser. No. 14/758,472, filed on Jun. 29, 2015, now U.S. Pat. No. 10,091,773, which is the National Stage filing under 35 U.S.C. 371 of International Application No. PCT/KR2014/000085, filed on Jan. 6, 2014, which claims the benefit of U.S. Provisional Application No. 61/749,876, filed on Jan. 7, 2013, 61/755,935, filed on Jan. 23, 2013, 61/821,690, filed on May 9, 2013 and 61/836,656, filed on Jun. 18, 2013, the contents of which are all hereby incorporated by reference herein in their entirety.

TECHNICAL FIELD

The present invention relates to a wireless communication system and, more particularly, to a method and apparatus for transmitting and receiving a signal based on radio resource dynamic change in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for transmitting and receiving a signal based on radio resource dynamic change in a wireless communication system.

Technical Solution

The object of the present invention can be achieved by providing a method for, at a user equipment (UE), transmitting and receiving a signal to and from a base station in a time division duplex (TDD) communication system including receiving reference subframe configuration information via system information and receiving operation subframe configuration information via dynamic signaling, receiving uplink grant for transmission of an uplink signal in a downlink subframe defined in the operation subframe configuration information, determining validity of a specific uplink subframe for transmission of the uplink signal indicated in the uplink grant, and transmitting the uplink signal to the base station if the specific uplink subframe is valid.

The validity of the specific uplink subframe may be determined based on predetermined operation subframe configuration information among the reference subframe configuration information, the operation subframe configuration information and subframe configuration information for downlink hybrid automatic repeat and request (HARQ). The subframe configuration information for downlink HARQ may be subframe configuration information defining HARQ acknowledgement (ACK)/negative ACK (NACK) for a physical downlink control channel (PDSCH) received from the base station.

The determining the validity of the specific uplink subframe may include determining that the specific uplink subframe is invalid if the specific uplink subframe is defined as a downlink subframe in the predetermined operation subframe configuration information. The method may further include processing the uplink grant as a reception error if the specific uplink subframe is invalid. The uplink signal scheduled in the uplink grant is not transmitted, if the specific uplink subframe is invalid.

In another aspect of the present invention, provided herein is a user equipment (UE) apparatus in a time division duplex (TDD) communication system including a wireless communication module configured to transmit and receive a signal to and from a base station and a processor configured to process the signal, wherein the processor is configured to control the wireless communication module to receive reference subframe configuration information via system information, to receive operation subframe configuration information via dynamic signaling, to receive uplink grant for transmission of an uplink signal in a downlink subframe defined in the operation subframe configuration information, to determine validity of a specific uplink subframe for transmission of the uplink signal indicated in the uplink grant, and to transmit the uplink signal to the base station if the specific uplink subframe is valid.

The processor may determine the validity of the specific uplink subframe based on predetermined operation subframe configuration information among the reference subframe configuration information, the operation subframe configuration information and subframe configuration information for downlink hybrid automatic repeat and request (HARQ). The subframe configuration information for downlink HARQ may be subframe configuration information defining HARQ acknowledgement (ACK)/negative ACK (NACK) for a physical downlink control channel (PDSCH) received from the base station.

The processor may determine that the specific uplink subframe is invalid if the specific uplink subframe is defined as a downlink subframe in the predetermined operation subframe configuration information. The processor may process the uplink grant as a reception error if the specific uplink subframe is invalid. The processor may control the wireless communication module such that the uplink signal scheduled in the uplink grant is not transmitted, if the specific uplink subframe is invalid.

Advantageous Effects

According to embodiments of the present invention, a base station and a user equipment (UE) can efficiently transmit and receive a signal while dynamically changing radio resources in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
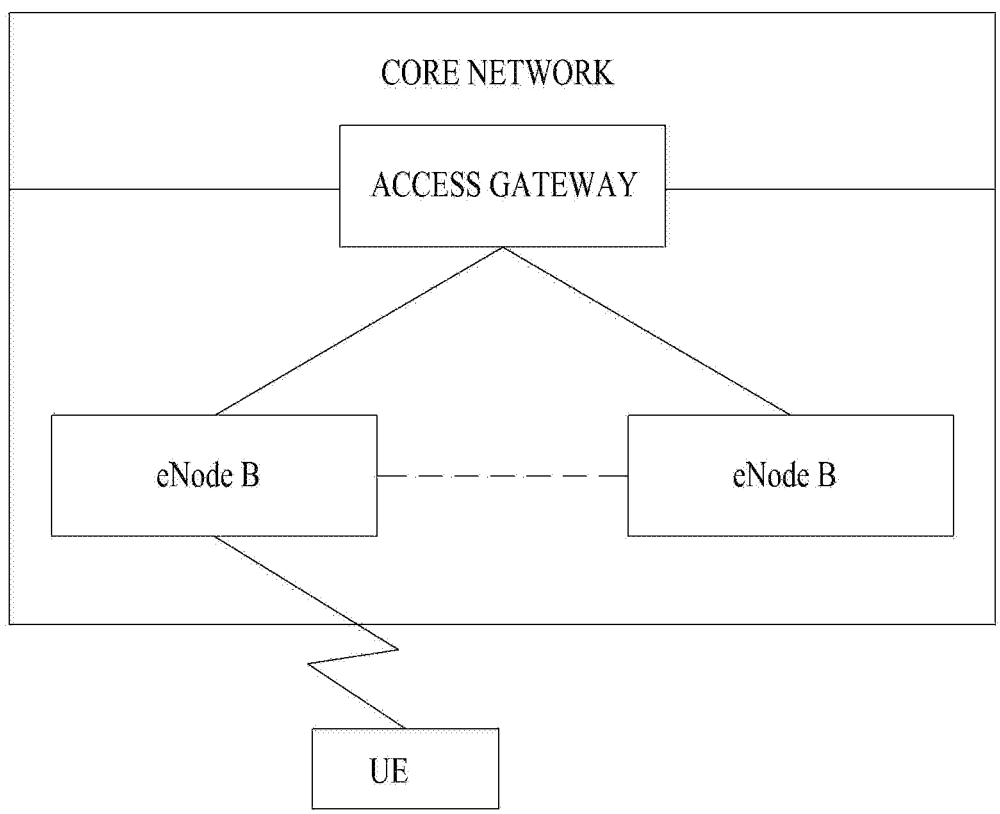
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
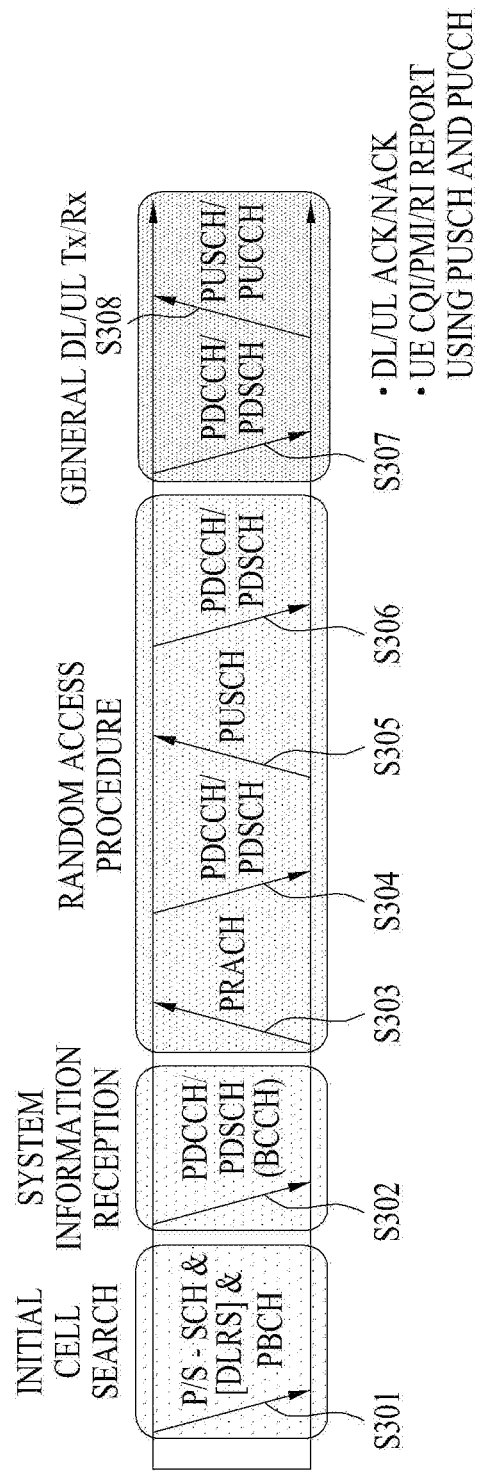
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
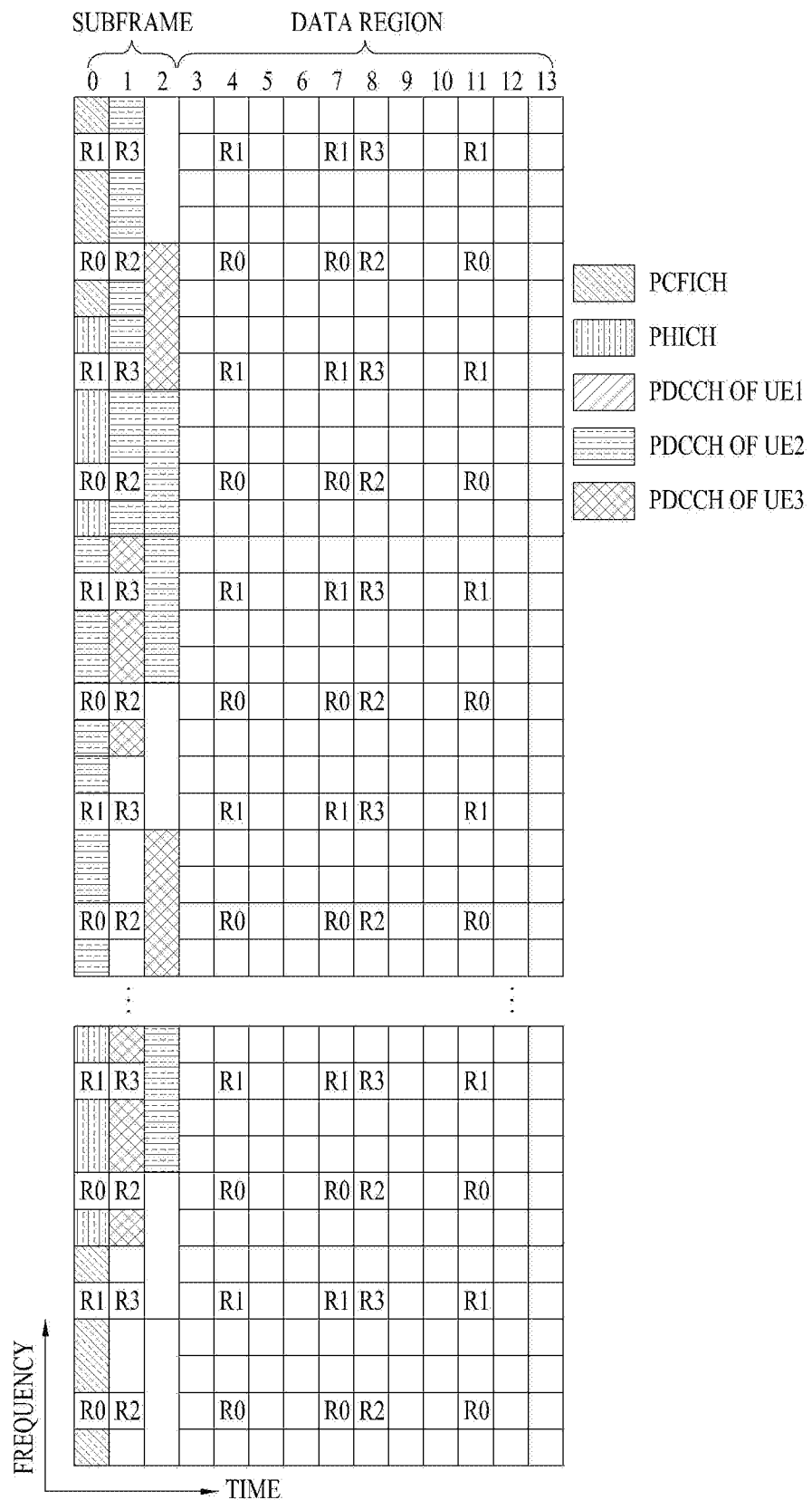
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
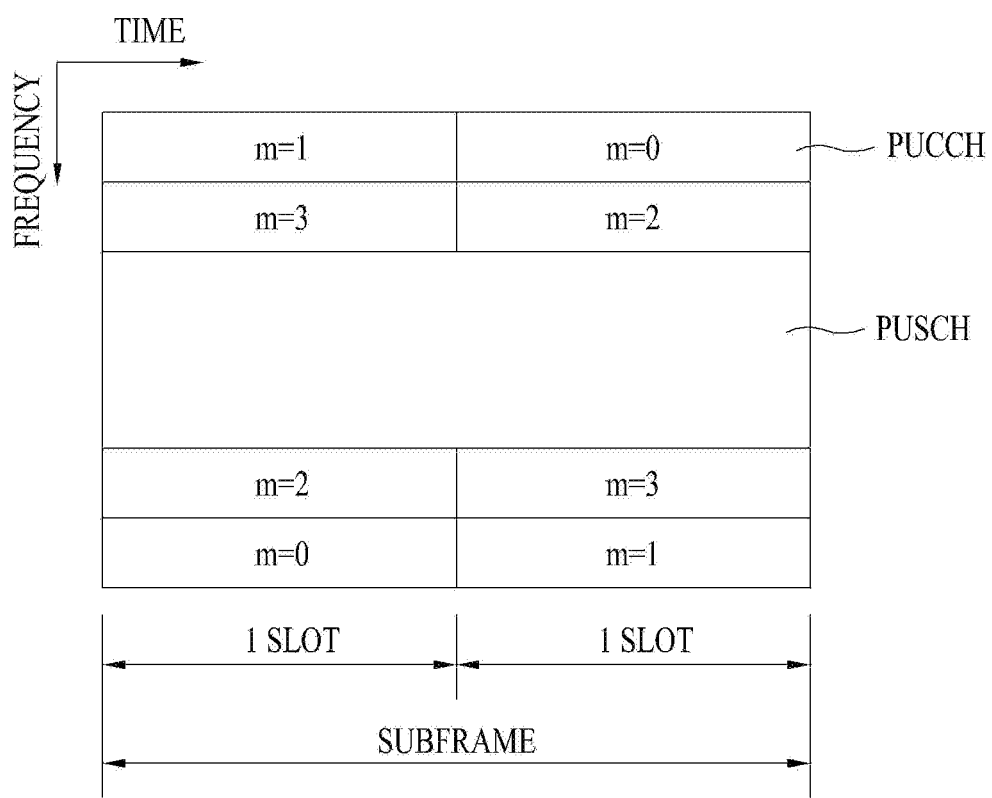
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
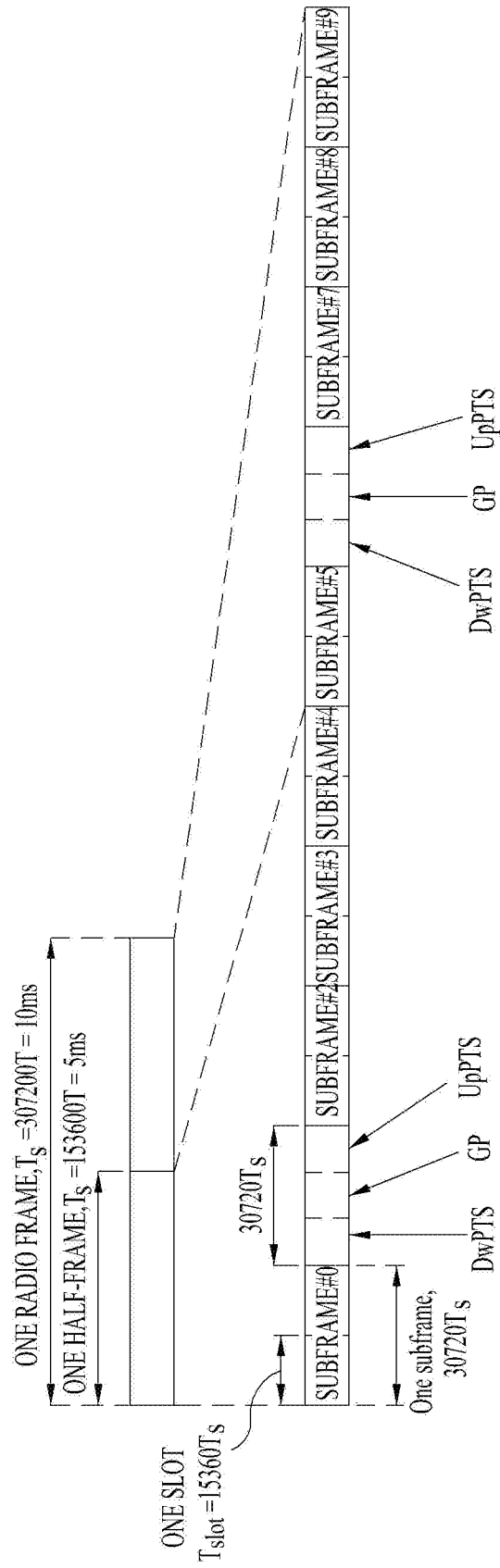
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Tables 2 to 4 show HARQ timelines in a UL/DL configuration of Table 1. Table 2 shows a transmission subframe index set of a PDSCH corresponding to HARQ-ACK transmitted in a specific uplink subframe. For example, in UL/DL configuration #1, HARQ-ACK for PDSCHs received in subframe #5 and #6 is transmitted in subframe #2.

TABLE 2

| UL/DLL Configuration | 0 | 1 | 2 | 3 | 4 | 5 | 6 | 7 | 8 | 9 |
|---|---|---|---|---|---|---|---|---|---|---|
| 0 | D | S | U 6 | | U 0 | D | S | U 1 | | U 5 |

TABLE 2-continued

| UL/DLL Configuration | 0 | 1 | 2 | 3 | 4 | 5 | 6 | 7 | 8 | 9 |
|---|---|---|---|---|---|---|---|---|---|---|
| 1 | D | S | U 5, 6 | U 9 | D | D | S | U 0, 1 | U 4 | D |
| 2 | D | S | U 4, 5, 6, 8 | D | D | D | S | U 0, 1, 3, 9 | D | D |
| 3 | D | S | U 1, 5, 6 | U 7, 8 | U 0, 9 | D | D | D | D | D |
| 4 | D | S | U 0, 1, 4, 5 | U 6, 7, 8, 9 | D | D | D | D | D | D |
| 5 | D | S | U 0, 1, 3, 4, 5, 6, 7, 8, 9 | D | D | D | D | D | D | D |
| 6 | D | S | U 5 | U 6 | U 9 | D | S | U 0 | U 1 | D |

Next, Table 3 shows a transmission subframe index of uplink grant scheduling a PUSCH transmitted in a specific uplink subframe. For example, in UL/DL configuration #1, a PUSCH transmitted in subframe #2 is scheduled by uplink grant transmitted in subframe #6. In particular, since UL/DL configuration #0 of Table 3 corresponds to a special case in which the number of DL subframes is less than that of UL subframes, PUSCHs of two UL subframes may be scheduled in one downlink subframe and to which subframe the PUSCH belongs is indicated using a UL index field of downlink control information (DCI). That is, whether an index in parentheses of Table 3 is used, whether a parenthesis-free index is used or whether the PUSCH is scheduled in two subframes using two indices is determined according to the indicator of the uplink index.

TABLE 3

| UL/DLL Config-uration | 0 | 1 | 2 | 3 | 4 | 5 | 6 | 7 | 8 | 9 |
|---|---|---|---|---|---|---|---|---|---|---|
| 0 | D | S | U 6, (5) | U (6) | U 0 | D | S | U 1, (0) | U (1) | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 5 | U 6 | U 9 | D | S | U 0 | U 1 | D |

Finally, Table 4 shows the index of a subframe, in which a PHICH is transmitted, when a PUSCH is transmitted in a specific UL subframe. For example, in UL/DL configuration #1, a PHICH for a PUSCH transmitted in subframe #2 is received in subframe #6.

TABLE 4

| UL/DLL Config-uration | 0 | 1 | 2 | 3 | 4 | 5 | 6 | 7 | 8 | 9 |
|---|---|---|---|---|---|---|---|---|---|---|
| 0 | D | S | U 6 | U 0 | U 0 | D | S | U 1 | U 5 | U 5 |
| 1 | D | S | U 6 | U 9 | D | D | S | U 1 | U 4 | D |
| 2 | D | S | U 8 | D | D | D | S | U 3 | D | D |

TABLE 4-continued

| UL/DLL Config-uration | 0 | 1 | 2 | 3 | 4 | 5 | 6 | 7 | 8 | 9 |
|---|---|---|---|---|---|---|---|---|---|---|
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 6 | U 9 | U 0 | D | S | U 1 | U 5 | D |

Hereinafter, a carrier aggregation scheme will be described.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

A system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. The component carriers may have the same bandwidth, or the component carriers may have different bandwidths. In addition, the component carriers may be adjacent to each other in the frequency domain, or the component carriers may be physically adjacent to each other or may be spaced apart from each other.

Component carriers can use different center frequencies or use one common center frequency with respect to physically adjacent component carriers. For example, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC, that is, a secondary CC. In addition, the primary CC may also be referred to as a primary cell (PCell) and furthermore, the secondary CC may also be referred to as a secondary cell (SCell).

The present invention proposes a method of efficiently determining resource usage when operation for determining whether each resource is used as a DL resource or a UL resource is dynamically performed, in the case in which an eNB divides all available resources into DL resources used to transmit a signal from the eNB to a UE and UL resources used to transmit a signal from the UE to the eNB to perform duplex operation. Such dynamic resource usage change is advantageous in that optimal resource distribution is possible every time in a state in which the sizes of downlink traffic and uplink traffic are dynamically changed.

In an FDD system, since a frequency band is divided into a DL band and a UL band, for such dynamic resource usage change, the eNB may specify whether a specific band is a DL resource or a UL resource at a specific timing via RRC layer signaling, a MAC layer signaling or physical layer signaling.

In contrast, in a TDD system, an entire subframe is divided into a UL subframe and a DL subframe, both of which are respectively used for UL transmission of a UE and DL transmission of an eNB. Such a UL/DL configuration is generally known to a UE via system information and a 3GPP LTE system provides the UL/DL configuration shown in Table 1. In addition to the UL/DL configuration shown in Table 1, a new UL/DL configuration may be further provided. Even in a TDD system, for dynamic resource usage change, an eNB may specify whether a specific subframe is a DL resource or a UL resource at a specific timing via RRC layer signaling, MAC layer signaling or physical layer signaling.

As described above, in a legacy LTE system, a DL resource and a UL resource are specified via system information. Since this system information should be transmitted to a plurality of unspecified UEs, when resource usage is dynamically changed, problems may occur in legacy UEs. Accordingly, in general, information on such dynamic resource usage change is preferably delivered to UEs which are currently being connected to an eNB via new signaling and, more particularly, UE-specific signaling, in addition to signaling for delivering the system information.

New signaling may indicate a dynamically changed resource configuration, for example, UL/DL configuration information different from that indicated in system information in a TDD system. Additionally, new signaling may include information related to HARQ. In particular, when a scheduling message, a PDSCH reception timing/PUSCH transmission timing corresponding thereto, and a HARQ timeline defined as a HARQ-ACK transmission and reception timing are dynamically changed, in order to solve a problem that HARQ timelines are discontinuous, HARQ timeline configuration information capable of maintaining a stable HARQ timeline may be included in new signaling. In a TDD system, this HARQ timeline configuration information may be defined as a UL/DL configuration referred to when a DL HARQ timeline and/or a UL HARQ timeline are defined.

A UE, which has accessed a system in which resource usage is dynamically changed, receives a variety of information on a resource configuration. In particular, in a TDD system, one UE may acquire information of 1) to 4) at a specific timing:

1) UL/DL configuration signaling 1: UL/DL configuration indicated in system information 2) UL/DL configuration signaling 2: UL/DL configuration delivered for the purpose of indicating usage of each subframe via separate signaling 3) UL/DL configuration signaling 3: UL/DL configuration delivered in order to define a DL HARQ timeline, that is, when HARQ-ACK for a PDSCH received at a specific timing is transmitted 4) UL/DL configuration signaling 4: UL/DL configuration delivered in order to define a UL HARQ timeline, that is, when a PUSCH for UL grant received at a specific timing is transmitted and when a PHICH for a PUSCH transmitted at a specific timing is received.

When a specific UE accesses an eNB in which resource usage is dynamically changed, the eNB generally operates to designate a UL/DL configuration, in which the number of UL subframes is largest, via system information. This is because there may be a restriction in dynamically changing a subframe configured as a DL subframe in the system information to a UL subframe.

For example, as such a restriction, legacy UEs, which do not recognize dynamic resource usage change, always measure cell-specific reference signals (CRSs) on the assumption that the CRS is transmitted on a subframe defined as a DL subframe. Therefore, when the DL subframe is dynamically changed to a UL subframe, errors may occur in CRS measurement of the legacy UEs. Accordingly, an eNB may set a maximum number of UL subframes in system information and dynamically change some of the UL subframes to DL subframes when downlink traffic increases.

In this case, the UE may receive UL/DL configuration #0 as system information at a specific timing but actually receive information indicating that resource usage of each subframe is UL/DL configuration #1. Additionally, the UE may receive UL/DL configuration #2 as a criterion of a DL HARQ timeline. More specifically, when a UL/DL configuration in which the number of UL subframes is small and the number of DL subframes is large is set as the criterion of the DL HARQ timeline, the number of DL subframes becomes largest and opportunities to transmit HARQ-ACK are concentrated on some subframes. When a DL HARQ timeline operates in this situation, even when the UL/DL configuration is dynamically changed, the HARQ timeline may be continuous. Similarly, the criterion of the UL HARQ timeline may be a UL/DL configuration in which the number of UL subframes is largest, such as UL/DL configuration #0.

In particular, as described above, when a DL subframe in system information cannot be changed to a UL subframe due to measurement errors of the legacy UEs, the UL/DL configuration in the system information may be regarded as a configuration in which the number of UL subframes is largest in a given situation. Therefore, the UL/DL configuration (signaling 1) in the system information and the configuration (signaling 4) which is the criterion of the UL HARQ timeline may be regarded as always being the same.

As described above, each UE may receive signaling of usage of various resources at a specific timing. According to signaling, nominal usage of a specific subframe is changed. Accordingly, when operation performed by the UE according to usage of the specific subframe is changed, a criterion for setting usage of the subframe should be clearly defined.

In particular, in a random access procedure, when a UE receives a PDCCH and DL-SCH linked to a valid RA-RNTI thereof (referred to as a random access response message) in subframe # n, a UL-SCH corresponding thereto is defined to be transmitted in subframe # n+6, a first valid UL subframe (when a UL delay field is 0) subsequent thereto or a next valid UL subframe (when a UL delay field is 1). This means that the transmission timing of the UL-SCH may be differently set according to the criterion for determining validity of the UL subframe at the UE. Hereinafter, methods A) to D) of determining the validity of the UL subframe in the random access procedure proposed by the present invention will be described.

Method A) Based on UL/DL Configuration in System Information

In method A), validity of a UL subframe is determined upon performing the random access procedure according to usage of a subframe configured in system information. Since the system information is used when all UEs connected to the eNB, including a legacy UE, receive the same information and operate according to the information, this method advantageously enables all UEs to perform the same procedure. That is, in the random access procedure in which transmission is instructed to be performed at the same timing, UL-SCH transmission is performed at the same timing if the UL delay field is the same.

Figure 7:
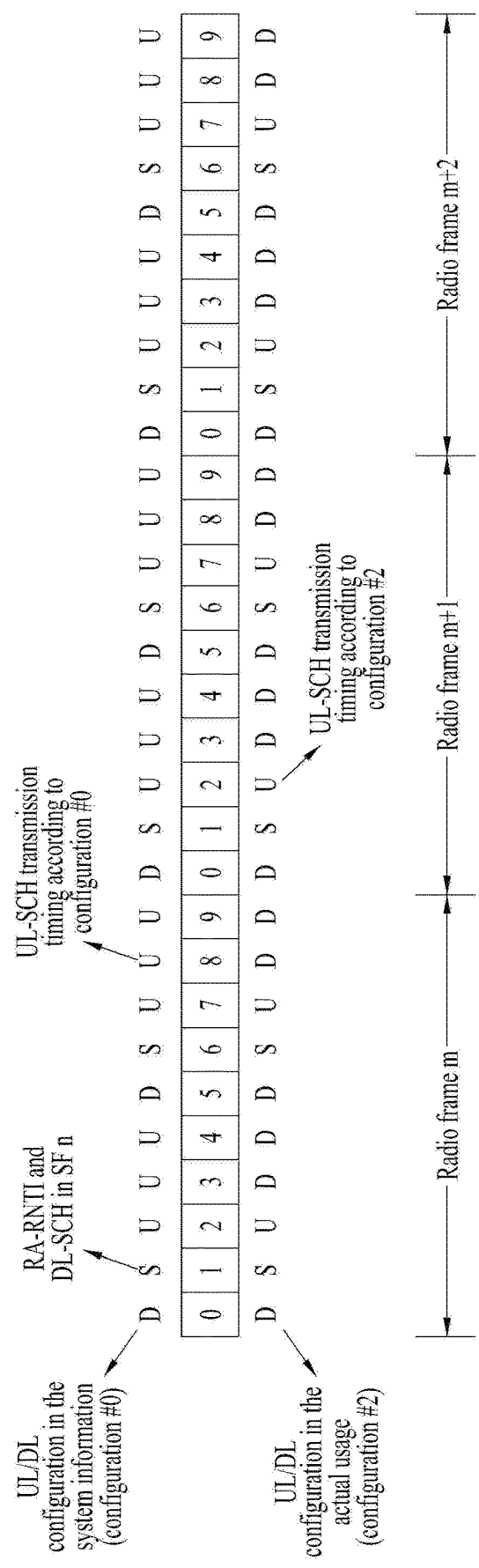
FIG. 7 is a diagram showing an example of performing a random access procedure according to an embodiment of the present invention.

FIG. 7 shows an example of performing a random access procedure according to an embodiment of the present invention. In particular, in FIG. 7, assume that UL/DL configuration #0 is used in system information (that is, UL/DL configuration #0 is indicated by UL/DL configuration signaling 1), UL/DL configuration #2 is used for actual signal transmission and reception (that is, UL/DL configuration #2 is indicated by UL/DL configuration signaling 2) and the UL delay field is 1.

Referring to FIG. 7, when the RA-RNTI of the UE and the DL-SCH associated therewith are transmitted in subframe #1 of radio frame # m, subframe #7 corresponding to subframe # n+6 is a valid UL subframe and a next subframe thereof is also a valid UL subframe according to UL/DL configuration #0 which is the UL/DL configuration in the system information and thus subframe #8 of the same frame is a UL-SCH transmission timing. However, this is different from UL/DL configuration #2 in actual usage. That is, according to UL/DL configuration #2, since subframe #8 is a downlink subframe, subframe #2 of radio frame # m+1 is a UL-SCH transmission timing.

When the UL/DL configuration based on the system information is used, the UL-SCH transmission timing may be a DL subframe in actual usage.

At this time, the UE i) determines that the DL-SCH corresponding to the PDCCH masked with the RA-RNTI thereof is wrongly detected and does not perform UL-SCH transmission or ii) determines that signaling for actual usage is wrongly received or new signaling is not received and transmits the UL-SCH at the transmission timing set according to UL/DL configuration based on the system information. In either case, the UE may inform the eNB that transmission and reception operation thereof conflicts with actual subframe usage, that is, UL transmission is instructed to be performed in a DL subframe in actual usage, via RRC layer signaling or MAC layer signaling.

Method B) Based on Configuration in Signaling for Specifying Actual Usage

In method B), validity of a UL subframe is determined upon performing the random access procedure according to usage of the subframe on signaling for specifying actual subframe usage. Referring to FIG. 7 again, the UL-SCH is transmitted in subframe #2 of radio frame # m+1 according to UL/DL configuration #2 in actual subframe usage. This method is disadvantageous in that this is commonly applicable to only UEs, which have received signaling for specifying actual subframe usage, but is advantageous in that the UL-SCH is transmitted according to actual subframe usage.

For example, in FIG. 7, if signaling errors do not occur, operation is performed according to system information and UL/DL configuration #2 is used in actual subframe usage, when a UL-SCH scheduling message is transmitted in subframe #1 according to method A), the UL-SCH should be transmitted in subframe #8. However, since subframe #8 is instructed to be used for downlink according to UL/DL configuration #2 as actual subframe usage, a scheduling message scheduling the UL-SCH cannot be transmitted in subframe #1. In this case, as in method B), such restriction may be avoided according to actual subframe usage and scheduling of an arbitrary downlink subframe and a special subframe becomes possible. This is because conflict in UE operation, such as subframe #8, in which the UL-SCH is transmitted, being a DL subframe in the actual UL/DL configuration, which may be caused when the UL/DL configuration in the system information is used, is solved.

According to method B), there is a probability that reception of a subframe usage indication signal fails in a process of crossing a radio frame. In order to eliminate such a probability, a random access response message may be valid only in a time interval in which the subframe usage indication signal is not changed. For example, the UE may assume that the subframe usage change indicator is not transmitted between timing 1 and timing 2, when a random access response message received at timing 1 indicates UL-SCH transmission at timing 2. Timing 1 and timing 2 may be interpreted as belonging to a valid time interval of one subframe usage change indicator. Alternatively, when a new subframe usage change indicator is transmitted between timing 1 and timing 2, the new usage change indicator may be interpreted as always indicating the same subframe usage as a previous subframe usage change indicator.

Of course, when the UE receives the subframe usage change indicator indicating different subframe usage between two timings, this change indicator may be regarded as a reception error and/or operation for omitting related UL-SCH transmission may be added.

Method C) Based on Configuration in Signaling for Downlink HARQ Timeline

In method C), validity of a UL subframe is determined upon performing a random access procedure according to usage of a subframe in a UL/DL configuration specified by an eNB in order to configure a DL HARQ timeline. The UL/DL configuration specified as the DL HARQ timeline prepares for the case in which the number of valid UL subframes is smallest and thus a restriction on transmission of a scheduling message for a random access procedure is eliminated. Further, such a HARQ timeline is persistently configured as compared to actual usage, the random access procedure may be stably performed even when errors occur in reception of signaling indicating subframe usage.

Figure 8:
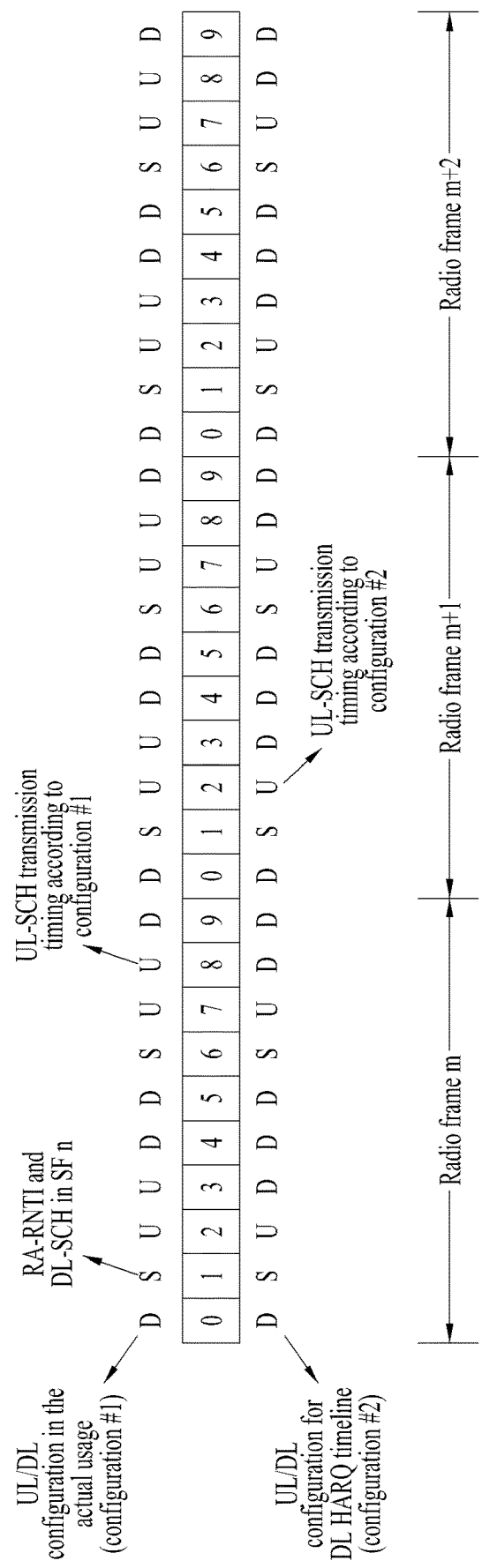
FIG. 8 is a diagram showing another example of performing a random access procedure according to an embodiment of the present invention.

FIG. 8 is a diagram showing another example of performing a random access procedure according to an embodiment of the present invention. In particular, in FIG. 8, UL/DL configuration #1 is used as actual usage and UL/DL configuration #2 is used as a criterion of a DL HARQ timeline.

Referring to FIG. 8, regardless of actual usage, according to UL/DL configuration #2 configured for DL HARQ, UL-SCH transmission for random access scheduling (assume that the UL delay field is set to 1) received in subframe #1 of radio frame # m is performed in subframe #2 of radio frame # m+1.

Method D) Based on Configuration in Signaling for UL HARQ Timeline

In method D), according to usage of the subframe on the UL/DL configuration specified by the eNB in order to configure the UL HARQ timeline, validity of the UL subframe is determined upon performing the random access procedure. In particular, method D) is advantageous in that implementation of a scheduler is simplified because the UL-SCH on random access may be scheduled in consideration of the UL/DL configuration based on the same HARQ timeline as a normal PUSCH.

The above-described methods are applicable to an FDD system. In case of the FDD system, in a legacy system, only UL transmission of the UE is possible in a UL band. However, if technology of dynamically changing resource usage is introduced, some subframes of the UL band may be used for DL transmission of the eNB. In this case, the subframe of the UL band is divided into a UL subframe and a DL subframe similarly to TDD and a variety of signaling, e.g., signaling of actual usage of each subframe, usage of a subframe which is a criterion of the timeline for DL HARQ or UL HARQ, or a UL/DL configuration may be defined. In this case, since a legacy UE regards all subframes of a UL band as UL subframes, a UL/DL configuration in system information may be configured as a UL/DL configuration in which all subframes are UL subframes.

In addition, the signaling method proposed in the above-described embodiments may be used for procedures other than the random access procedure. For example, a signaling method and operation for, at a UE, informing an eNB that transmission/reception operation thereof conflicts with actual usage via RRC layer signaling or MAC layer signaling may be performed when the UE finds such conflict during an operation other than the random access procedure. More specifically, when the eNB schedules PUSCH transmission (or PDSCH transmission) with respect to a subframe which is regarded as a DL subframe (or a UL subframe) by the UE in actual subframe usage, the UE may find and report conflict in the indication of the eNB to the eNB.

Figure 9:
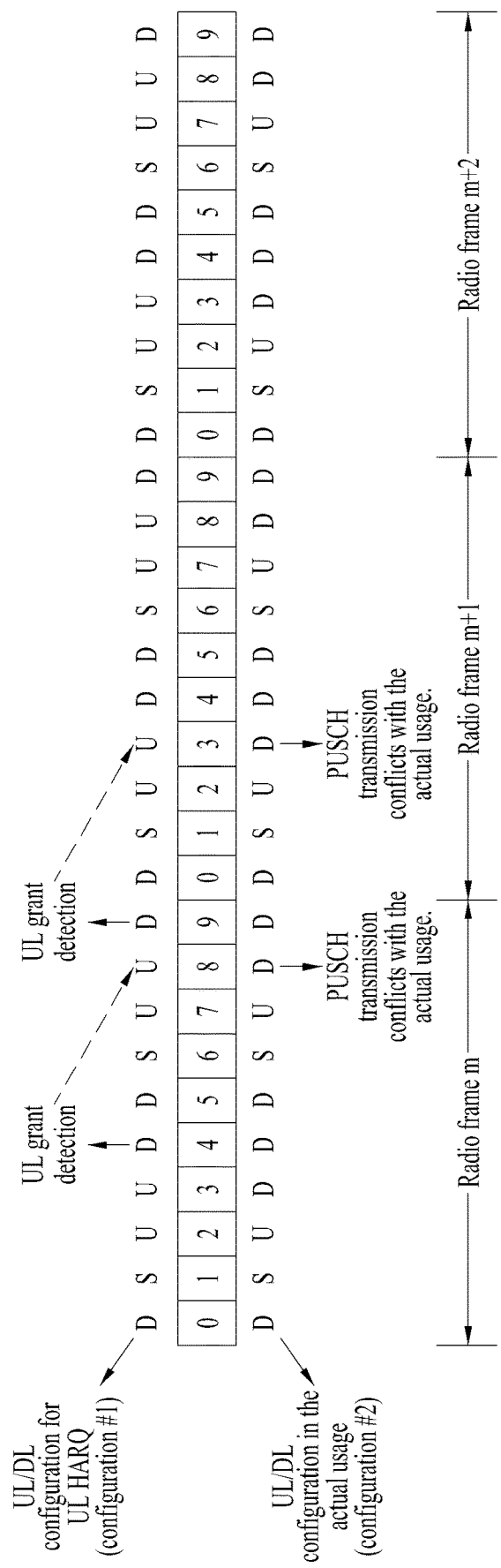
FIG. 9 is a diagram showing an example of performing uplink transmission according to an embodiment of the present invention.

FIG. 9 shows an example of performing UL transmission according to an embodiment of the present invention. In particular, in FIG. 9, UL/DL configuration #2 is used in actual subframe usage and UL/DL configuration #1 is used for a UL HARQ timeline.

Referring to FIG. 9, when the UE detects UL grant in subframe #4 and subframe #9, PUSCH transmission is attempted in subframe #8 and subframe #3 according to the UL HARQ timeline of UL/DL configuration #1. Since such PUSCH transmission attempt conflicts with actual subframe usage configured as a DL subframe, the UE finds conflict with the indication of the eNB.

Meanwhile, even in aperiodic SRS transmission in which the UE starts transmission in a specific subframe which first satisfies a predetermined condition starting from a subframe separated from a triggering timing by a predetermined time, the UL/DL configuration in which the condition used to determine the aperiodic SRS transmission timing is applied to the UL subframe should be determined. This is similar to the above-described random access procedure in that the UE transmits the signal in the subframe satisfying the predetermined condition when a predetermined time has passed since the UL signal transmission indication from the eNB.

Accordingly, even in such aperiodic SRS operation, SRS transmission timing may be determined with respect to subframes which are configured as UL subframes on the reference UL/DL configuration, based on one of four UL/DL configurations of the above-described UL/DL configuration signaling 1 to 4. That is, a specific subframe first satisfying the predetermined condition may be defined as a first subframe satisfying a specific condition and configured as a UL subframe in the predetermined UL/DL configuration.

Meanwhile, if UL/DL configuration #0 is used as the criterion of the UL HARQ timeline, conflict in subframe usage may be found even in the special UL index configuration. For example, when the UE detects UL grant in subframe #6 and the UL index configuration of the UL grant indicates PUSCH transmission in subframe #3 but UL/DL configuration #2 in which subframe #3 is configured as a DL subframe is indicated in actual subframe usage, conflict between two signals may be found.

Hereinafter, methods of, at a UE, finding and processing conflict with the indication of the eNB related to subframe usage will be described.

The UE may find conflict with the indication of the eNB related to subframe usage when detecting UL grant indicating PUSCH transmission in a subframe, actual usage of which is set to a DL subframe. FIG. 9 shows such an example.

When conflicted UL grant is detected N (=1, 2, ...) times during a predetermined time, the UE regards this as conflict in eNB signaling and reports this to the eNB. Detection of the conflicted UL grant N−1 times during the predetermined time may be regarded as false alarm of the UL grant, that is, detection of the UL grant which is not transmitted by the eNB.

Since a subframe for transmitting UL grant is always a DL subframe, a UE always attempts to detect DCI format 1A in order to acquire scheduling information of a PDSCH and DCI format 0 having the same length is automatically detected in this process without a separate decoding process, such conflicted UL grant may be restricted to DCI format 0 having the same length as DCI format 1A scheduling the PDSCH. The eNB may deliver the number N of times of detection of the conflicted UL grant to the UE via higher layer signaling such as RRC layer signaling and adjust until when false alarm is regarded as occurring and since when a signaling transmission error is regarded as occurring.

Such conflicted UL grant may include retransmission indicated via a PHICH as well as UL grant transmitted on a PDCCH or an EPDCCH. When the UE detects a PHICH NACK signal of a specific DL subframe and receives an instruction on PUSCH retransmission in a specific subframe, if the subframe is configured as a DL subframe in actual usage, the instruction via the PHICH is also regarded as conflicted UL grant.

For the conflicted UL grant, the UE may regard the UL grant as false alarm and omit the PUSCH transmission process. This operation is applicable until conflicted UL grant is detected (N−1) times. Alternatively, the UE may regard conflict as occurring because the UE does not receive new actual usage indication signaling and perform PUSCH transmission according to UL grant. The eNB may instruct to perform one of the two operations via higher layer signaling such as RRC signaling. In a special case, if UL/DL configuration #0 is used in a UL HARQ timeline, PUSCH transmission in two subframes may be simultaneously indicated in one UL grant. In this case, a specific subframe may be a UL subframe in actual usage but another subframe may be a UL subframe in actual usage. At this time, the following operations 1 to 3 may be performed according to priority between UL grant detection and subframe usage signaling.

Operation 1: Priority is given to UL grant to transmit the PUSCHs in the two subframes.

Operation 2: Priority is given to subframe usage signaling not to transmit the PUSCH in any subframe. That is, the UL grant is regarded as false alarm.

Operation 3: The PUSCH is transmitted in a subframe configured as a UL subframe but is not transmitted in a subframe configured as a DL subframe. This operation is a compromise between operation 1 and operation 2 and enables continuous HARQ operation in a UL subframe while preventing the UE from missing actual subframe usage signaling to cause strong interference with an adjacent UE for receiving a PDSCH.

Meanwhile, when the conflicted eNB indication is found, the UE may determine that the current UL/DL configuration of the eNB is different from the configuration understood thereby and perform related operation according to the most conservative UL/DL configuration for operation stability. Here, the most conservative UL/DL configuration means a UL/DL configuration including only common operation in all UL/DL configurations indicated by the eNB.

As in operation 3, when the eNB transmits UL grant but the UE finds conflict that the PUSCH should be transmitted in the downlink subframe, operation for regarding the UL grant as false alarm not to transmit the PUSCH may be interpreted as operation for selecting the most conservative UL/DL configuration in the two UL/DL subframe configurations indicated by the eNB and understood by the UE, that is, the UL/DL configuration including only the common part for the PUSCH in the two UL/DL configurations, because the related operation is performed only when PUSCH transmission is possible in the UL/DL configuration indicated by the eNB and the UL/DL configuration understood by the UE.

In general, in case of PUSCH transmission, the most conservative UL/DL configuration may be a UL/DL configuration having only subframes configured as UL subframes in all UL/DL configurations used by the eNB. This may be a UL/DL configuration determined to define a DL HARQ timeline. The most conservative UL/DL configuration may be fixed to UL/DL configuration #5 which is a UL/DL configuration having fewest UL subframes among the UL/DL configurations of Table 1. Alternatively, if it is assumed that the eNB does not change a DL-UL switching period, the most conservative UL/DL configuration may be a UL/DL configuration having fewest UL subframes on the same DL-UL switching period (e.g., UL/DL configuration #2 if the DL-UL switching period is 5 ms and UL/DL configuration #5 if the DL-UL switching period is 10 ms). Alternatively, the most conservative UL/DL configuration may be specified via separate signaling.

If the most conservative UL/DL configuration is determined in PUSCH transmission, the UE may regard the UL grant for the subframe in which PUSCH transmission is possible as being valid even in the most conservative UL/DL configuration and transmit the PUSCH, when conflict is found in the indication of the eNB. However, when the UL grant detected by the UE indicates PUSCH transmission in the subframe defined as the DL subframe in the most conservative UL/DL configuration, the UE may regard the UL grant as false alarm and may not transmit the PUSCH.

Alternatively, in order to omit the process of determining the most conservative UL/DL configuration, the most conservative UL/DL configuration may be defined as a UL/DL configuration in which all subframes are DL subframes in association with PUSCH transmission. This means that the UE omits PUSCH transmission if conflict is found in the indication of the eNB.

The same principle is applicable to PDSCH reception and HARQ-ACK transmission related thereto. If the UE finds conflict in the indication of the eNB (e.g., if a message scheduling a PDSCH in a subframe, usage of which is set to a UL subframe, is received), the most conservative UL/DL configuration is selected from the viewpoint of the PDSCH. Thereafter, in the selected UL/DL configuration, a subframe in which PDSCH transmission is possible is regarded as being valid to perform PDSCH reception and related HARQ-ACK transmission. However, if a UL subframe is defined in the selected UL/DL configuration, PDSCH scheduling for the subframe is regarded as false alarm and PDSCH reception is not attempted, that is, the PDSCH is received but the result is not stored in a buffer, and the related HARQ-ACK is not transmitted. In other words, HARQ-ACK is processed as DTX.

From the viewpoint of the PDSCH, the most conservative UL/DL configuration may be a UL/DL configuration having only subframes configured as DL subframes (or special subframes) among all UL/DL configurations used by the eNB. This means that the UL/DL configuration determined in order to define the UL HARQ timeline may be selected.

Alternatively, the most conservative UL/DL configuration may be fixed to UL/DL configuration #0 which is a UL/DL configuration having fewest DL subframes among the UL/DL configurations of Table 1. In this case, if it is assumed that the eNB does not change a DL-UL switching period, the most conservative UL/DL configuration may be a UL/DL configuration having fewest UL subframes in the same DL-UL switching period (e.g., UL/DL configuration #2 if the DL-UL switching period is 5 ms and UL/DL configuration #3 if the DL-UL switching period is 10 ms).

Alternatively, in order to omit the process of determining the most conservative UL/DL configuration, the most conservative UL/DL configuration may be defined as a UL/DL configuration in which all subframes are UL subframes from the viewpoint of PDSCH transmission. This means that the UE omits PDSCH transmission and also omits HARQ-ACK transmission if conflict is found in the indication of the eNB.

When the UE receives a higher layer signal indicating uplink transmission in a subframe configured as a DL subframe, conflict may be found. Such UL transmission may include periodic CSI report, periodic SRS transmission and periodically repeated SR transmission resource allocation. When several times of SRS transmission are indicated by one aperiodic SRS transmission triggering message even in aperiodic SRS transmission, if SRS transmission is performed in a subframe, usage of which is set to a DL subframe, conflict may be found and reported.

Even in this case, conflicted UL transmission indication may be regarded as a signaling transmission error and thus may be omitted. This method is conservative because an interference signal which is not planned by the eNB can be prevented but may be regarded as a safer method. In contrast, signaling for actual usage indication may be regarded as an error and an uplink transmission indication may be used. In particular, if actual usage indication signaling is delivered via MAC layer signaling or physical layer signaling but uplink transmission indication is delivered via RRC layer signaling which is higher layer signaling, uplink transmission may be performed according to the uplink transmission indication having higher reliability.

If a valid period of signaling indicating usage of each subframe is set, the UE may find conflict when the UE does not successfully receive new signaling even after the valid period of the received signal has elapsed.

Figure 10:
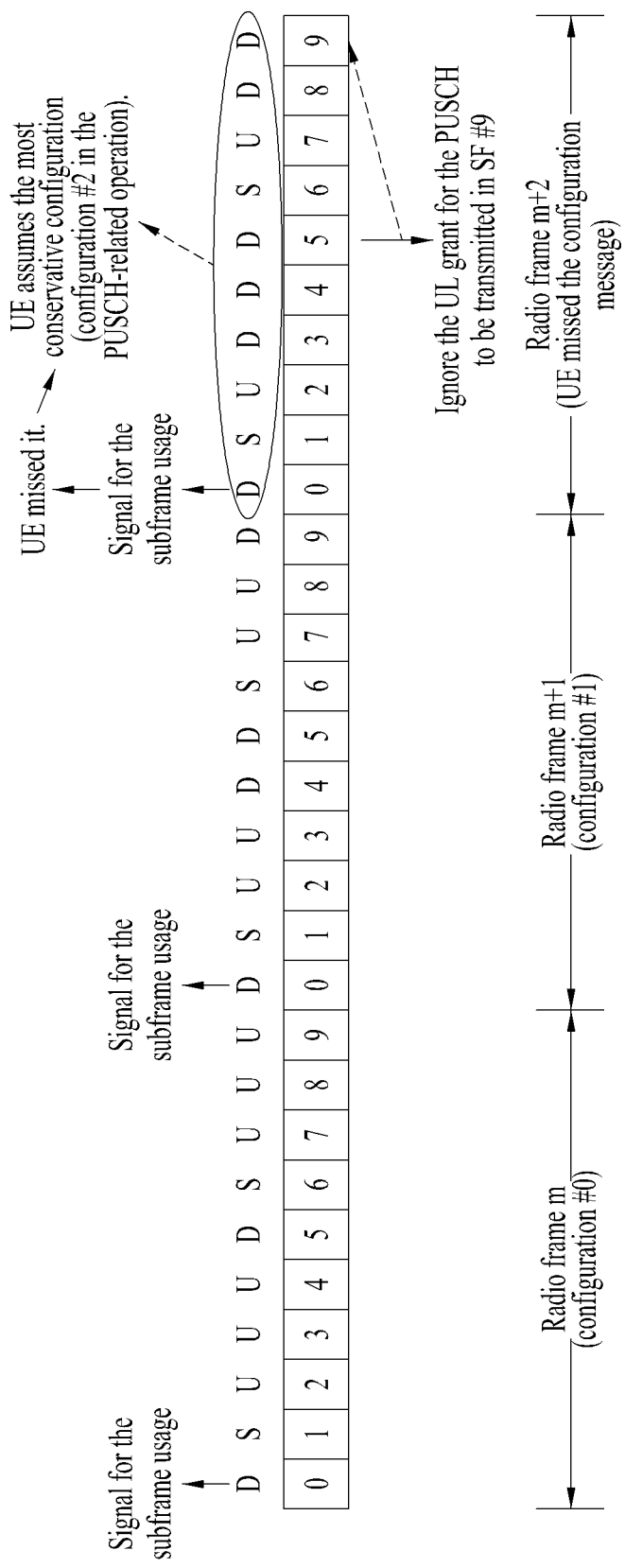
FIG. 10 is a diagram showing an example in which a UE finds conflict in subframe usage according to an embodiment of the present invention.

FIG. 10 is a diagram showing an example in which a UE finds conflict in subframe usage according to an embodiment of the present invention.

Referring to FIG. 10, if signaling indicating usage of each subframe is periodically transmitted, signaling transmitted at a specific timing may be regarded as being valid during one transmission period of the signaling. In this case, when the UE fails to receive the signaling in a next period, usage of a subframe to be used in the next period may not be checked.

Alternatively, even when usage indication signaling of a subframe is aperiodically transmitted, a valid period in which the transmitted signaling is valid during a predetermined period may be set. When new signaling is not received even after the valid period has elapsed, the UE may not check usage of the subframe to be used after the valid period has elapsed.

In this case, the UE may automatically regard conflict as occurring in the indication of the eNB and apply the above-described methods to reduce problems caused in conflict. In particular, in this state, since the eNB cannot check which subframe usage is applied, the method for performing PDSCH reception or PUSCH transmission related operation according to the most conservative UL/DL configuration may be employed.

In particular, in FIG. 10, signaling indicating subframe usage of the radio frame is transmitted in subframe #0 of every radio frame, but the UE does not receive subframe usage indication signaling in radio frame # m+2. At this time, the UE selects the most conservative UL/DL configuration applicable to radio frame # m+2. In particular, in FIG. 10, assume that UL/DL configuration #2 is selected as the most conservative UL/DL configuration related to PUSCH transmission.

In this state, if the UE receives UL grant in subframe #5 and this UL grant indicates PUSCH transmission in subframe #9 (on the assumption that the UL HARQ timeline of UL/DL configuration #0 is used), the UE regards this UL grant as false alarm and does not perform PUSCH transmission, because subframe #9 is a DL subframe in UL/DL configuration #2 which is the most conservative UL/DL configuration selected in association with PUSCH transmission. In particular, since the UL grant is transmitted before a predetermined subframe from actual PUSCH transmission timing, UL grant transmission and PUSCH transmission corresponding thereto may be performed in different radio frames and the UL/DL configuration may be changed.

In particular, even when the UL grant is received in radio frame # m and the PUSCH is transmitted in radio frame # m+1, operation when subframe usage indication reception fails is applicable. That is, for continuity of UL HARQ operation, if it is assumed that the UL grant is transmitted only in the DL subframe in the most conservative UL/DL configuration, when reception of the subframe usage indication signal in radio frame # m+1 fails, conflict in the indication of the eNB is regarded as occurring in radio frame # m+1 and operation is performed according to conflict.

Meanwhile, in case of aperiodic SRS transmitted when a predetermined time has elapsed after triggering is performed by DCI, only the UL subframe may be applied to the defined condition based on the above-described UL/DL configuration to determine the transmission timing. If the reference UL/DL configuration is a UL/DL configuration according to the subframe usage indication signal, the SRS transmission condition is stably applicable to all radio frames present between the transmission timing of the triggering signal of aperiodic SRS and the actual transmission timing of the SRS only when the UE successfully receives the subframe usage indication signal. Accordingly, only when the UE successfully receives the subframe usage indication signal, the SRS may be transmitted in all radio frames between the two timings.

In other words, in a state in which the UE receives the triggered aperiodic SRS in a specific radio frame and determines the transmission timing thereof under a series of conditions, once reception of the subframe usage indication signal fails or conflict is found in the indication of the eNB, the transmission conditions of the aperiodic SRS are regarded as being not accurately applied and SRS transmission is omitted in order to prevent interference with an adjacent UE.

Alternatively, in order to prevent failure of reception of the subframe usage indication signal in a process of crossing a radio frame, an aperiodic SRS triggering message may be regarded as being valid only during a time interval where the subframe usage indication signal is not changed.

For example, the UE may assume that the subframe usage change indicator is not transmitted between timing 1 and timing 2, when the aperiodic SRS triggering message received at timing 1 indicates SRS transmission at timing 2. This may be interpreted as timing 1 and timing 2 belonging to a valid time interval of one subframe usage change indicator. Alternatively, when the subframe usage change indicator may be newly transmitted between timing 1 and timing 2, the new usage change indicator may always be interpreted as indicating the same subframe usage as the previous subframe usage change indicator. At this time, if the UE receives the subframe usage change indicator indicating different subframe usage between the two timings, this change indicator may be regarded as an error and/or related SRS transmission may be omitted.

If an additional restriction is imposed on change in subframe usage, for example, if a restriction indicating that the number of subframes, usage of which is changed by one signal, cannot exceed m is imposed, the most conservative UL/DL configuration may be set based on the restriction. For example, if UL/DL configuration #3 is specified at a specific timing as subframe usage indication but the valid time of the indication is expired and the UE does not receive new signaling and if the number of subframes, usage of which is changed by one signal, is restricted to 1 or less, even when the number of DL subframes is increased in the new UL/DL configuration, the UE may confirm that only UL/DL configuration #4 is set. That is, UL/DL configuration #5 in which usage of two subframes is changed cannot be signaled based on UL/DL configuration #3. At this time, the most conservative UL/DL configuration becomes UL/DL configuration #4 from the viewpoint of the PUSCH and PUSCH related operation may be performed based on UL/DL configuration #4.

In addition, when the valid period of signaling indicating usage of each subframe is set, when one signal is received and a signal indicating usage of another subframe is received before the valid period has elapsed, the UE may regard one signal as an error. Additionally, the UE may confirm that the UL/DL configuration indicated by the eNB conflicts with the UL/DL configuration understood thereby. Even in this case, since information on the UL/DL configuration indicated by the eNB is insufficient, operation according to the most conservative UL/DL configuration may be more stably performed.

In summary, signaling for subframe usage change may be periodically transmitted and UE operation when the signaling is missed is as follows.

First, in downlink, PDCCH monitoring may be defined according to the UL/DL configuration indicated in system information. Since the PDCCH schedules the PDSCH of the same subframe, if the UL/DL configuration indicated in the system information is selected as the most conservative UL/DL configuration from the viewpoint of PDSCH reception, PDCCH monitoring is performed according to the UL/DL configuration indicated in the system information. In addition, in uplink, the criterion of determining the validity of PUSCH scheduling may be defined according to the UL/DL configuration indicated in the system information in order to define the same operation as PDCCH monitoring or may be defined according to the UL/DL configuration indicated as the most conservative UL/DL configuration for DL HARQ.

Conflict in the indication of the eNB is applicable to a carrier aggregation scheme.

For example, in a state in which the UE confirms that deactivation of a specific secondary cell or secondary component carrier is indicated by signaling of the eNB, a message scheduling PDSCH or PUSCH transmission in the secondary component carrier via another component carrier may be received via a higher layer signal such as RRC or a PDCCH/EPDCCH. Similarly, such a situation may be regarded as conflicted transmission indication and the scheduling message is regarded as an error, the component carrier deactivation information is regarded as an error and/or a signal indicating that the eNB is informed that the conflicted indication is received is transmitted. In a state of applying the carrier aggregation scheme, signaling indicating subframe usage of the secondary component carrier may be transmitted via a primary component carrier, because the primary component carrier is in a stable signaling transmission environment.

In a cross carrier scheduling state, the message detected by the UE may be detected in the component carrier for transmitting the scheduling message to find a conflicted indication. Assume that the UE performs scheduling of a specific primary component carrier (hereinafter, referred to as SCell) in the primary component carrier (hereinafter, referred to as PCell). If the E receives the UL grant indicating the PUSCH in subframe # n+k of the SCell from the PCell in subframe # n and subframe # n+k is a DL subframe in the PCell, the UE attempts to detect the scheduling message in subframe # n+k. As a result, DL assignment information indicating PDSCH reception in the SCell in subframe # n+k may be detected. In general, since the UE performs only one of DL reception and UL transmission in the same subframe, this may be regarded as conflict in eNB scheduling.

If such conflict is detected, the UE may give priority to perform one of PDSCH reception and PUSCH transmission. Priority may be predefined or set by the eNB in advance. Alternatively, priority may be changed according to circumstances. For example, if control information such as CSI or UL HARQ ACK is included in the PUSCH along with general data, priority is given to PUSCH transmission and, otherwise, priority is given to PDSCH reception. Alternatively, priority is not given and DL assignment and UL grant are invalidated, thereby maintaining stable operation. This means that the UE, which has found scheduling conflict, does not perform DL reception and UL transmission.

As described above, the UE detecting the scheduling message indicating PDSCH reception and PUSCH transmission in the same subframe may not be restricted to cross carrier scheduling. For example, if PDSCH reception or PUSCH transmission in a plurality of subframes is indicated via one scheduling message, priority may be given to latest reception/transmission operation. As another example, when PDSCH reception is started at subframe # n via specific DL assignment and is repeated in several subframes, the PUSCH is instructed to be transmitted starting from subframe # n+x via UL grant. However, subframe # n+x is consistent with the subframe for receiving the PDSCH, priority is given to PUSCH transmission to which the scheduling message is recently applied, such that PUSCH transmission is started in subframe # n+x. Here, if one scheduling message indicates PDSCH reception or PUSCH transmission in a plurality of subframes, semi-persistent scheduling may be included. Of course, even in this case, DL assignment and UL grant may be invalidated for conservative operation.

Of course, the UL transmission indication may include PUCCH transmission indication or SRS transmission indication as well as PUSCH transmission indication. In addition, if UL transmission is stably indicated via a higher layer signal such as RRC, PDSCH reception dynamically indicated via the PDCCH/EPDCCH may be regarded as being unstable and PDSCH reception may be invalidated. That is, priority is given to UL transmission. Similarly, like semi-persistent scheduling, in the subframe for receiving the PDSCH, the transmission position of which is indicated via a higher layer signal, if PUSCH transmission dynamically indicated via the PDCCH/EPDCCH is scheduled, dynamic indication may be regarded as being unstable and the PDSCH may be received. Even in this case, for stable operation, DL assignment and UL grant may be invalidated.

Figure 11:
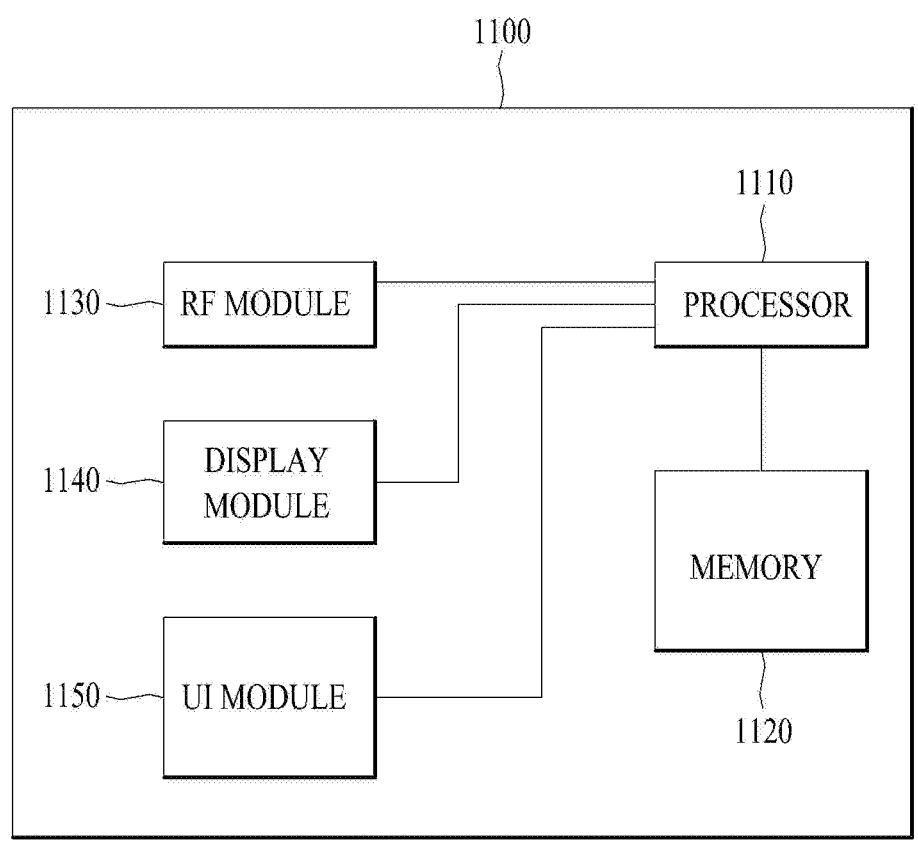
FIG. 11 is a block diagram of a communication apparatus according to an embodiment of the present invention.

FIG. 11 is a block diagram of a structure of a communication device according to an embodiment of the present invention.

Referring to FIG. 11, the communication device 1100 includes a processor 1110, a memory 1120, an RF module 1130, a display module 1140, and a user interface module 1150.

The communication device 1100 is illustrated for convenience of description and some modules may not be omitted. The communication device 1100 may further include necessary modules. In addition, some modules of the communication device 1100 may be subdivided. The processor 1110 is configured to perform operations according to the embodiment of the present invention that is exemplified with reference to the diagrams. In detail, a detailed operation of the processor 1110 would be understood with reference to FIGS. 1 to 10.

The memory 1120 is connected to the processor 1110 and stores an operating system, an application, a program code, data, etc. The RF module 1130 is connected to the processor 1110 and converts a baseband signal into a radio signal or converts a radio signal into a baseband signal. To this end, the RF module 1130 performs analog conversion, amplification, filtering, and frequency up-conversion, or inverse procedures thereof. The display module 1140 is connected to the processor 1110 and displays various pieces of information. The display module 1140 may use, but is not limited to, well-known elements such as a liquid crystal display (LCD), a light emitting diode (LED), and an organic light emitting diode (OLED). The user interface module 1150 may be connected to the processor 1110 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example in which a method and apparatus for transmitting and receiving a signal based on radio resource dynamic change in a wireless communication system is applied to a 3GPP LTE system is described, the present invention is applicable to various wireless communication systems in addition to the 3GPP LTE system.

What is claimed is:

1. A method for transmitting a Sounding Reference Signal (SRS) by a user equipment (UE) in a wireless communication, the method comprising:
   receiving, from a base station (BS), information related to a first uplink-downlink (UL-DL) configuration;
   monitoring a physical downlink control channel (PDCCH) to detect a downlink control information (DCI) related to a second UL-DL configuration;
   transmitting, to the BS, the SRS based on the second UL-DL configuration, when the DCI is detected from the PDCCH; and
   dropping transmission of the SRS in a subframe informed as a downlink subframe by the first UL-DL configuration, when the DCI is not detected from the PDCCH.

2. The method according to claim 1, wherein a physical uplink shared channel (PUSCH) is transmitted only in subframe informed as uplink subframe by the second UL-DL configuration.

3. The method according to claim 1, wherein a first uplink subframe for a physical uplink shared channel (PUSCH) transmission after a specific subframe is determined based on the first UL-DL configuration when a random access response (RAR) is received in the specific subframe.

4. The method according to claim 1, wherein the second UL-DL configuration is configured as same with the first UL-DL configuration when an error occurs to detect the DCI.

5. The method according to claim 1, wherein the second UL-DL configuration is configured as same with the first UL-DL configuration when the DCI is not detected.

6. A user equipment (UE) for transmitting a Sounding Reference Signal (SRS) in a wireless communication, the UE comprising:
   at least one transceiver;
   at least one processor; and
   at least one computer memory operably connectable to the at least one processor and storing instructions that, when executed, cause the at least one processor to perform operations comprising:
   receiving, via the at least one transceiver from a base station (BS), information related to a first uplink-downlink (UL-DL) configuration;
   monitoring a physical downlink control channel (PDCCH) to detect a downlink control information (DCI) related to a second UL-DL configuration;
   transmitting, via the at least one transceiver to the BS, the SRS based on the second UL-DL configuration, when the DCI is detected from the PDCCH; and
   dropping transmission of the SRS in a subframe informed as a downlink subframe by the first UL-DL configuration, when the DCI is not detected from the PDCCH.

7. The UE according to claim 6, wherein a physical uplink shared channel (PUSCH) is transmitted only in subframe informed as uplink subframe by the second UL-DL configuration.

8. The UE according to claim 6, wherein a first uplink subframe for a physical uplink shared channel (PUSCH) transmission after a specific subframe is determined based on the first UL-DL configuration when a random access response (RAR) is received in the specific subframe.

9. The UE according to claim 6, wherein the second UL-DL configuration is configured as same with the first UL-DL configuration when an error occurs to detect the DCI.

10. The UE according to claim 6, wherein the second UL-DL configuration is configured as same with the first UL-DL configuration when the DCI is not detected.

11. An apparatus for transmitting a Sounding Reference Signal (SRS) in a wireless communication, the apparatus comprising:
   at least one processor; and
   at least one computer memory operably connectable to the at least one processor and storing instructions that, when executed, cause the at least one processor to perform operations comprising:
   receiving, from a base station (BS), information related to a first uplink-downlink (UL-DL) configuration;
   monitoring a physical downlink control channel (PDCCH) to detect a downlink control information (DCI) related to a second UL-DL configuration;
   transmitting, to the BS, the SRS based on the second UL-DL configuration, when the DCI is detected from the PDCCH; and
   dropping transmission of the SRS in a subframe informed as a downlink subframe by the first UL-DL configuration, when the DCI is not detected from the PDCCH.

* * * * *